United States Patent [19]

Mills, Jr. et al.

[11] Patent Number: 4,524,415

[45] Date of Patent: Jun. 18, 1985

[54] VIRTUAL MACHINE DATA PROCESSOR

[75] Inventors: Marvin A. Mills, Jr., Indiatlantic, Fla.; William C. Moyer, Austin, Tex.; Douglas B. MacGregor, Austin, Tex.; John E. Zolnowsky, Austin, Tex.

[73] Assignee: Motorola, Inc., Schaumburg, Ill.

[21] Appl. No.: 447,721

[22] Filed: Dec. 7, 1982

[51] Int. Cl.³ .............................................. G06F 9/30
[52] U.S. Cl. .................................................. 364/200
[58] Field of Search ...................... 371/19, 16, 15, 21, 371/12; 364/200, 900

[56] References Cited

U.S. PATENT DOCUMENTS

| | | | |
|---|---|---|---|
| 3,976,978 | 8/1976 | Patterson et al. | 364/200 |
| 4,010,450 | 3/1977 | Porter et al. | 364/200 |
| 4,044,337 | 8/1977 | Hicks et al. | 364/200 |
| 4,045,661 | 8/1977 | Antoine et al. | 371/12 |
| 4,124,891 | 11/1978 | Weller, III et al. | 364/200 |
| 4,228,496 | 10/1980 | Katzman et al. | 364/200 |
| 4,315,310 | 2/1982 | Bayliss et al. | 364/200 |
| 4,321,666 | 3/1982 | Tasar et al. | 364/200 |
| 4,407,016 | 9/1983 | Bayliss et al. | 364/200 |
| 4,410,941 | 10/1983 | Barrow et al. | 364/200 |
| 4,415,969 | 11/1983 | Bayliss et al. | 364/200 |
| 4,443,849 | 4/1984 | Ohwada | 371/16 X |

Primary Examiner—Gareth D. Shaw
Assistant Examiner—Ronni S. Malamud
Attorney, Agent, or Firm—Anthony J. Sarli, Jr.; Jeffrey Van Myers

[57] ABSTRACT

A data processor capable of automatically storing in an external memory all essential information relating to the internal state thereof upon the detection of an access fault during instruction execution. Upon correction of the cause of the fault, the data processor automatically retrieves the stored state information and restores the state thereof in accordance with the retrieved state information. The data processor then resumes execution of the instruction. The faulted access may be selectively rerun upon the resumption of instruction execution. Means are provided to verify that the retrieved state information is valid.

8 Claims, 7 Drawing Figures

VIRTUAL MACHINE DATA PROCESSOR

Cross Reference to Related Applications

Related subject matter is disclosed in the following applications filed simultaneously herewith and assigned to the Assignee hereof:

U.S. patent application Ser. No. 446,801, entitled VIRTUAL MEMORY DATA PROCESSOR, inventors Lester M. Crudele, John Zolnowsky, William C. Moyer and Douglas B. MacGregor.

U.S. patent application Ser. No. 447,600, entitled DATA PROCESSOR VERSION VALIDATION, inventors Douglas B. MacGregor, William C. Moyer, Marvin A. Mills, Jr. and John Zolnowsky.

The present invention relates to data processors and, in particular, one which supports a virtual machine environment.

BACKGROUND ART

Digital data processing systems typically include a data processor having a characteristic logical address space, a limited amount of primary memory directly accessible within a physical address space, a much larger amount of secondary memory accessible only with the help of one or more peripheral controllers, and any of a number of customary input/output devices. In systems which include a data processor having a particularly large logical address space, the user may decide that his application is so time critical as to justify providing an equivalent amount of relatively expensive primary memory. More often, however, the user will choose to use these funds to provide a much larger amount of the less expensive secondary memory, and accept the time penalty associated with swapping portions of his programs/data between the primary and secondary memories as they are required by the processor. In general, the efficiency of the swapping operations depended upon the judicious segmentation of the application programs by a talented programmer into a series of interrelated, but somewhat autonomous overlays. To somewhat alleviate the problem of finding or developing such experienced programmers and the expense inherent in perfecting large segmented programs, supervisor programs were developed which allowed each application program to pretend that it had direct access to the full logical address space of the processor regardless of whether the corresponding physical address space was presently assigned to the program or even actually present in primary memory! Such "virtual memory" supervisor programs typically relied upon associative memory mapping hardware to detect accesses by the currently executing program outside the boundaries of the portion(s) of the physical address space assigned to the program. In response to such "faults", the processor would store some necessary state information before branching to a fault handling portion of the supervisor program which recognizes the "virtual" access and, if appropriate, loads the required program code/data from secondary memory into primary memory. If desired, the supervisor can move some of the program code/data from the primary memory to the secondary memory to make room for the new code/data. Typically, the supervisor program would then reexecute the particular instruction which the processor was executing when the fault occurred. Just how much information had to be stacked off and the mechanism employed by the supervisor program to prepare the processor to reexecute the "faulted" instruction varied from machine to machine.

In some designs, the processor simply stored the contents of the various user registers, the instruction register, the program counter and the current status information, just as if an interrupt had occurred. The supervisor program had to "back up" the program counter, if necessary, to find out what instruction the processor had been executing, and then to reconfigure the registers and status bits to approximate as close as possible the state of the processor when the faulted instruction was originally started. Even in systems where the processor instruction set was relatively regular and predictable, the burden placed on the supervisor program was far from insubstantial. In more complex systems, this approach was often impossible to implement.

When the burden on software became insurmountable, additional hardware was added to keep track of the instruction execution sequence by "marking" the completion of each step in the sequence. When a fault occurred, the mark information was stacked together with the register and status information. The supervisor program still had to determine which instruction the processor was executing at the time of the fault, and later instruct the hardware to reexecute that instruction. Now, however, the supervisor program could supply the "old" mark information to the hardware. As the hardware proceded through each step in the execution sequence, marking its progress as always, additional control circuitry would compare the "current" mark information with the "old" mark information. If the control circuitry determined that a particular step had already been performed before the fault occurred, it would suppress only the consequences of that step, and then allow the execution sequence to continue. Once the "current" and "old" mark information coincided, indicating that the processor had reached the step where the fault had occurred, the control circuitry ceased interfering in the actual performance of the succeeding steps in the execution sequence. In this manner, the burden of restarting a faulted instruction was shared between the software and the hardware. Of course, it was still the responsibility of the supervisor program to fix the underlying cause of the fault before attempting to restart the faulted instruction.

There is no inherent limitation in the virtual memory concept which restricts its use to single processor systems. In fact, multi-processor systems have been proposed where a fault encountered by one processor generates an interrupt to a parallel processor. Upon responding to the interrupt, the latter processor will attempt to fix the problem which caused the other processor's fault. Meanwhile, the faulted processor is simply kept waiting for the fault to be resolved. If and when the fault is successfully resolved by the other processor, the faulted processor goes on its way without ever being aware that the access fault occurred. Note that the supervisor program of the processor which assumes the task of fixing the faults requires no information on the instruction being executed by the faulted processor. It will however have to have access to the specifics of the logical address which was faulted, and some information about the address space of the program which encountered the fault. Such information can be easily latched during the course of each bus cycle so that it will be available when a fault occurs. Besides *requiring* at least two processors and additional latch and interrupt generation hardware, this virtual memory technique forces the faulted processor to wait until the other processor has corrected the fault, thus tieing up *both* processors during each fault resolution.

In multiprocessing systems, it is generally desirable that any processor in the system be able to execute any program awaiting execution. This could include resuming execution of a program which has been temporarily suspended because of an interrupt or time sharing constraints. As long as the several processors have the same instruction set, there is no hardware limitation which prevents such an arrangement. A problem arises when this technique is extended to include resuming execution of a program which has been suspended due to a fault condition in the course of executing an instruction. In order to properly resume execution of such a suspended program, the processor attempting to do so must execute the same instruction set in the same sequence as the processor which was originally executing the program. Otherwise, there is no assurance that the faulted instruction will be properly completed. While the supervisor of each processor can attempt to detect such incompatibilities, the same supervisor program may be simultaneously executing on several processors and must therefore rely upon the integrity of a memory based, resource data base for information on processor characteristics. In such software controlled systems, a substantial risk still exists that an incompatible processor resumption of a faulted program will go undetected.

In a virtual machine environment, the data processor must be able to support user program accesses to both real and non-existant system resources. In general, virtual memory data processors can be used in such systems to support the majority of accesses to data/instructions within the user program's logical address space. However, such processors are not able to support accesses to non-existant system resources. Accordingly, the supervisor simply intercepted accesses to such unavailable resources, and simulated the access using a compatible resource actually available in the system. The supervisor then made it appear to the faulted instruction that the access to the non-existent resource was successful.

SUMMARY OF THE INVENTION

Accordingly, it is an object of the present invention to provide a data processor which can support a virtual machine environment wherein a faulted instruction may be suspended while the cause of the fault is resolved, and thereafter resumed at the start of the access which had encountered the fault.

Another object of the present invention is to provide a virtual machine data processor wherein a faulted instruction is suspended while the cause of the fault is resolved and the faulted access performed, and then the faulted instruction is resumed as if the faulted access had been successful.

These and other objects of the present invention are achieved in a virtual machine data processor having an external access controller for providing access to a resource external to the data processor; an instruction execution controller for controlling the execution by the data processor of at least one instruction which requires at least one access to the resource via the external access controller; and an access fault recovery controller for storing information indicative of the state of the instruction execution controller as of the time an access fault is detected, and for restoring the state of the instruction execution controller using the stored state information after the access fault has been corrected. In the present invention, the data processor includes an access rerun controller for enabling the external access controller to rerun the faulted access upon the access fault recovery controller enabling the instruction execution controller to resume execution of the instruction, except in response to a rerun signal indicating that the access should not be rerun.

DETAILED DESCRIPTION OF INVENTION

Figure 1:
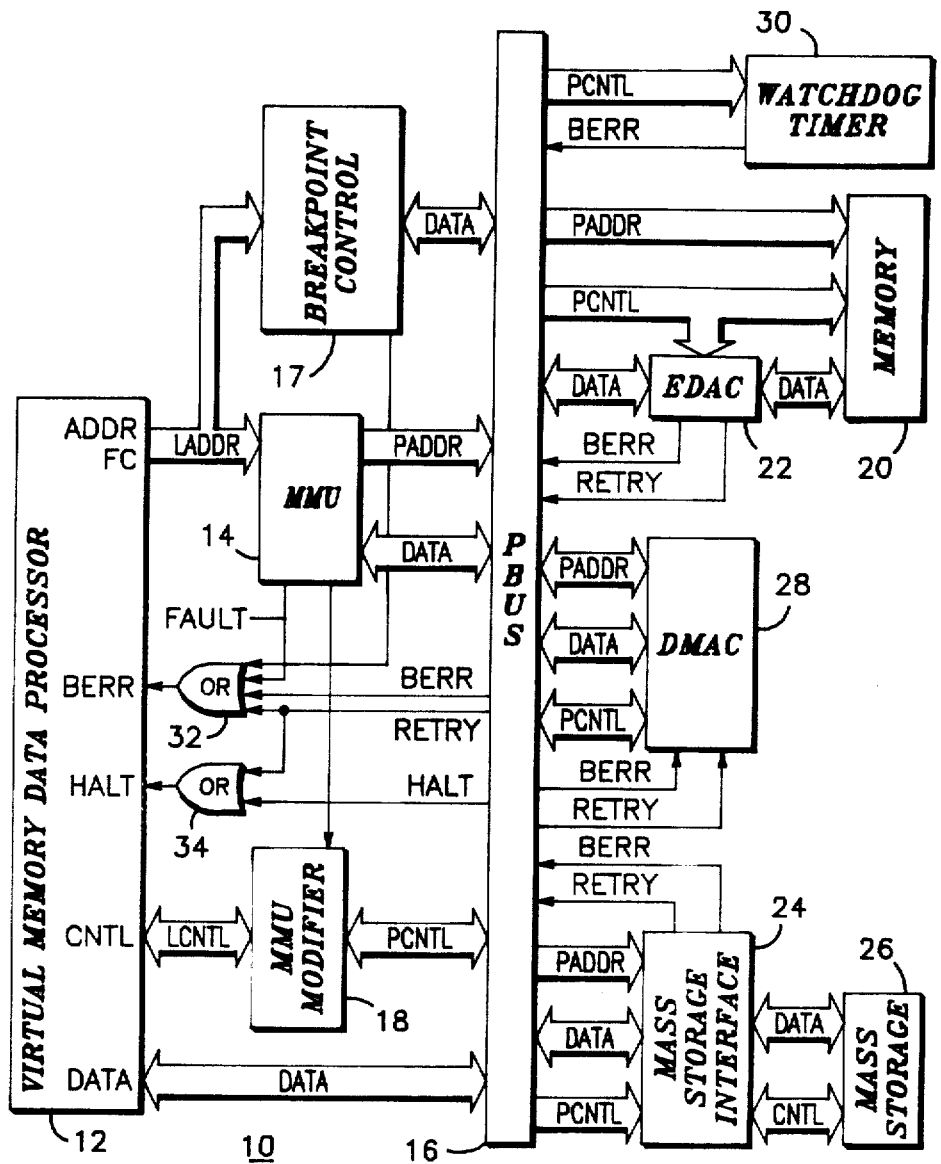
FIG. 1 is a block diagram of a virtual memory data processing system having the virtual memory data processor of the present invention.

Shown in FIG. 1 is a virtual memory data processing system 10 wherein logical addresses (LADDR) issued by a virtual memory data processor (VMDP) 12 are mapped by a memory management unit (MMU) 14 to a corresponding physical address (PADDR) for output on a physical bus (PBUS) 16. Simultaneously, the various logical access control signals (LCNTL) provided by VMDP 12 to control the access are converted to appropriately timed physical access control signals (PCNTL) by a modifier unit 18 under the control of MMU 14.

In response to a particular range of physical addresses (PADDR), memory 20 will cooperate with an error detection and correction circuit (EDAC) 22 to exchange data (DATA) with VMDP 12 in synchronization with the physical access control signals (PCNTL) on PBUS 16. Upon detecting an error in the data, EDAC 22 will either signal a bus error (BERR) or request VMDP 12 to retry (RETRY) the exchange, depending upon the type of error.

In response to a different physical address, mass storage interface 24 will cooperate with VMDP 12 to transfer data to or from mass storage 26. If an error occurs during the transfer, interface 24 may signal a bus error (BERR) or, if appropriate, request a retry (RETRY).

In response to yet another physical address, a direct memory access controller (DMAC) 28 will accept data from the VMDP 12 defining a data transfer operation. Upon being released to perform the operation, DMAC 28 will use appropriate PCNTL lines to periodically request VMDP 12 to relinquish control of the bus. Upon using granted control of the bus, the DMAC 28 will transfer a block of data within memory 20 or between memory 20 and mass storage 26. If an error is detected during any such transfer by either the EDAC 22 or mass storage interface 24, DMAC 28 will either abort or retry the transfer, depending upon whether BERR or RETRY was signaled.

In the event that the MMU 14 is unable to map a particular logical address (LADDR) into a corresponding physical address (PADDR), the MMU 14 will signal an access fault (FAULT). As a check for MMU 14, and for DMAC 28 as well, a watchdog timer 30 may be provided to signal a bus error (BERR) if no physical device has responded to a physical address (PADDR) within a suitable time period relative to the physical access control signals (PCNTL).

If, during a data access bus cycle, a RETRY is requested, OR gates 32 and 34 will respectively activate the BERR and HALT inputs of VMDP 12. In response to the simultaneous activation of both the BERR and HALT inputs thereof during a VMDP-controlled bus cycle, VMDP 12 will abort the current bus cycle and, upon the termination of the RETRY signal, retry the cycle.

If desired, operation of VMDP 12 may be externally controlled by judicious use of a HALT signal. In response to the activation of only the HALT input thereof via OR gate 34, VMDP 12 will halt at the end of the current bus cycle, and will resume operation only upon the termination of the HALT signal.

In response to the activation of only the BERR input thereof during a processor-controlled bus cycle, VMDP 12 will abort the current bus cycle, internally save the contents of the status register, enter the supervisor state, turn off the trace state if on, and generate a bus error vector number. VMDP 12 will then stack into a supervisor stack area in memory 20 a block of information which reflects the current internal context of the processor, and then use the vector number to branch to an error handling portion of the supervisor program.

Up to this point, the operation of VMDP 12 is identical to the operation of Motorola's MC68000 microprocessor. However, VMDP 12 differs from the MC68000 primarily in the amount of information which is stacked in response to the assertion of BERR. The information stacked by the MC68000 consists of: the saved status register, the current contents of the program counter, the contents of the instruction register which is usually the first word of the currently executing instruction, the logical address which was being accessed by the aborted bus cycle, and the characteristics of the aborted bus cycle, i.e. read/write, instruction/data and function code. In addition to the above information, VMDP 12 is constructed to stack much more information about the internal machine state. If the exception handler is successful in resolving the error, the last instruction thereof will return control of VMDP 12 to the aborted program. During the execution of this instruction, the additional stacked information is retrieved and loaded into the appropriate portions of VMDP 12 to restore the state which existed at the time the bus error occurred.

Under certain circumstances, such as when an access is attempted to a non-existent peripheral, the supervisor may choose to perform the requested access but utilize a different resource. If the faulted access was a read, the supervisor can store the accessed information in the appropriate location in the stack. To make it appear to the faulted instruction as if the non-existent peripheral had actually responded, the supervisor can set a flag in the stack indicating that the access has already been performed. Just before resuming execution of the faulted instruction, VMDP 12 can check the flag and, if set, can resume instruction execution as if the access had just been successfully completed. Thus, the faulted program will be unaware that the accessed resource is not actually present.

Figure 2:
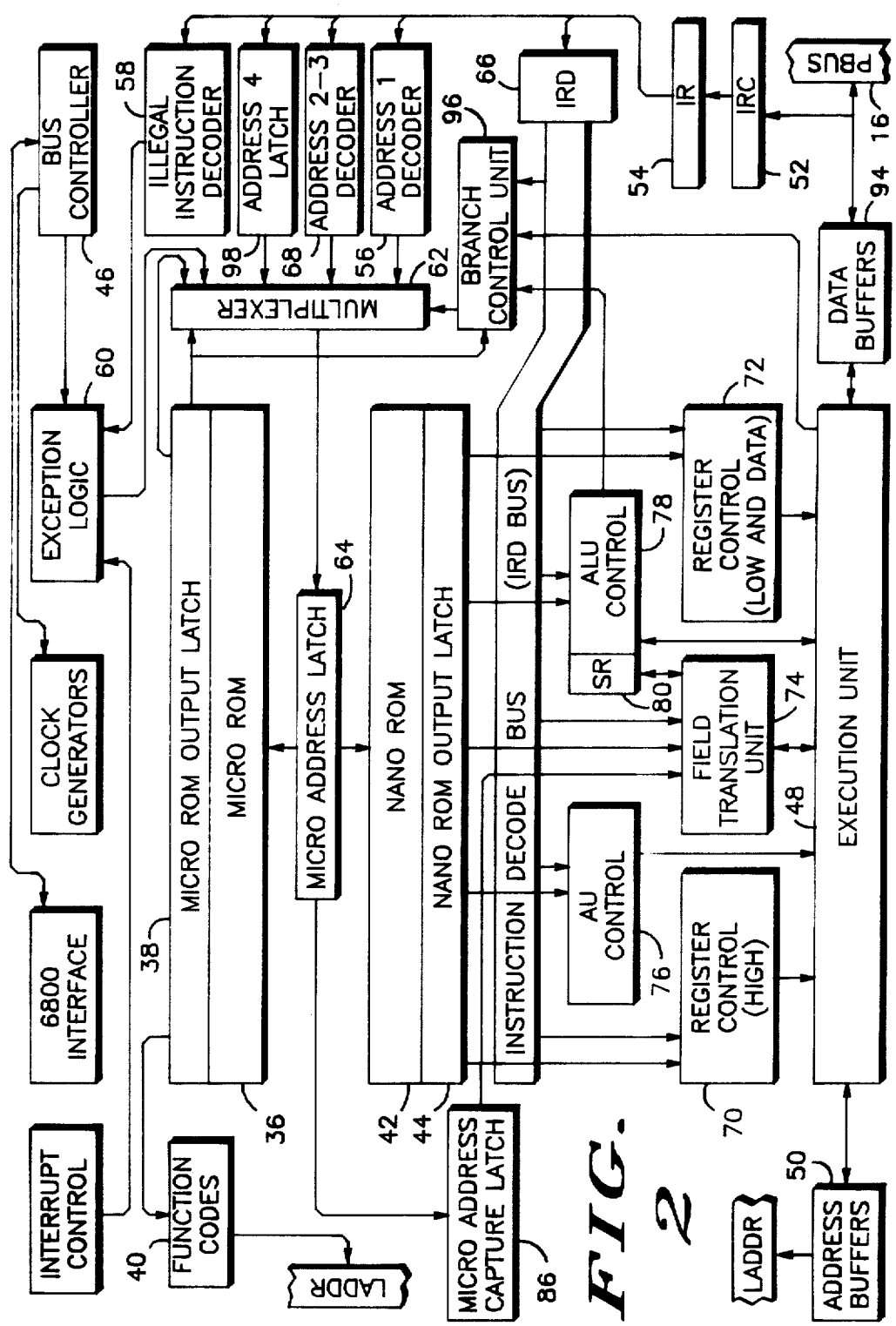
FIG. 2 is a block diagram of the virtual memory data processor of FIG. 1.

The preferred operation of VMDP 12 will be described with reference to FIG. 2 which illustrates the internal organization of a microprogrammable embodiment of VMDP 12. Since the illustrated form of VMDP 12 is very similar to the Motorola MC68000 microprocessor described in detail in the several U.S. Patents cited hereafter, the common operational aspects will be described rather broadly. Once a general understanding of the internal architecture of VMDP 12 is established, the discussion will focus on the unique aspects which distinguish VMDP 12 from the MC68000, and enable the former to support virtual memory.

The VMDP 12, like the MC68000, is a pipelined, microprogrammed data processor. In a pipelined processor, each instruction is typically fetched during the execution of the preceding instruction, and the interpretation of the fetched instruction usually begins before the end of the preceding instruction. In a microprogrammed data processor, each instruction is executed as a sequence of microinstructions which perform small pieces of the operation defined by the instruction. If desired, user instructions may be thought of as macroinstructions to avoid confusion with the microinstructions. In the MC68000 and VMDP 12, each microinstruction comprises a microword which controls microinstruction sequencing and function code generation, and a corresponding nanoword which controls the actual routing of information between functional units and the actuation of special function units within VMDP 12. With this in mind, a typical instruction execution cycle will be described.

At an appropriate time during the execution of each instruction, a prefetch microinstruction will be executed. The microword portion thereof will, upon being loaded from micro ROM 36 into micro ROM output latch 38, enable function code buffers 40 to output a function code (FC) portion of the logical address (LADDR) indicating an instruction cycle. Upon being simultaneously loaded from nano ROM 42 into nano ROM output latch 44, the corresponding nanoword requests bus controller 46 to perform an instruction fetch bus cycle, and instructs execution unit 48 to provide the logical address of the first word of the next instruction to address buffers 50. Upon obtaining control of the PBUS 16, bus controller 46 will enable address buffers 50 to output the address portion of the logical address (LADDR). Shortly thereafter, bus controller 46 will provide appropriate data strobes (some of the LCNTL signals) to activate memory 20. When the memory 20 has provided the requested information, bus controller 46 enables instruction register capture (IRC) 52 to input the first word of the next instruction from PBUS 16. At a later point in the execution of the current instruction, another microinstruction will be executed to transfer the first word of the next instruction from IRC 52 into instruction register (IR) 54, and to load the next word from memory 20 into IRC 52. Depending upon the type of instruction in IR 54, the word in IRC 52 may be immediate data, the address of an operand, or the first word of a subsequent instruction. Details of the instruction set and the microinstruction sequences thereof are set forth fully in U.S. Pat. No. 4,325,121 entitled "Two Level Control Store for Microprogrammed Data Processor", issued Apr. 13, 1982 to Gunter et al.

As soon as the first word of the next instruction has been loaded into IR 54, address 1 decoder 56 begins decoding certain control fields in the instruction to determine the micro address of the first microinstruction in the initial microsequence of the particular instruction in IR 54. Simultaneously, illegal instruction decoder 58 will begin examining the format of the instruction in IR 54. If the format is determined to be incorrect, illegal instruction decoder 58 will provide the micro address of the first microinstruction of an illegal instruction microsequence. In response to the format error, exception logic 60 will force multiplexor 62 to substitute the micro address provided by illegal instruction decoder 58 for the micro address provide by address 1 decoder 56. Thus, upon execution of the last microinstruction of the currently executing instruction, the microword portion thereof may enable multiplexor 62 to provide to an appropriate micro address to micro address latch 64, while the nanoword portion thereof enables instruction register decoder (IRD) 66 to load the first word of the next instruction from IR 54. Upon the selected micro address being loaded into micro address latch 64, micro ROM 36 will output a respective microword to micro ROM output latch 38 and nano ROM 42 will output a corresponding nanoword to nano ROM output latch 44.

Generally, a portion of each microword which is loaded into micro ROM output latch 38 specifies the micro address of the next microinstruction to be executed, while another portion determines which of the alternative micro addresses will be selected by multiplexor 62 for input to micro address latch 64. In certain instructions, more than one microsequence must be executed to accomplish the specified operation. These tasks, such as indirect address resolution, are generally specified using additional control fields within the instruction. The micro addresses of the first microinstructions for these additional microsequences are developed by address ⅔ decoder 68 using control information in IR 54. In the simpler form of such instructions, the first microsequence will typically perform some preparatory task and then enable multiplexor 62 to select the micro address of the microsequence which will perform the actual operation as developed by the address 3 portion of address ⅔ decoder 68. In more complex forms of such instructions, the first microsequence will perform the first preparatory task and then will enable multiplexor 62 to select the micro address of the next preparatory microsequence as developed by the address 2 portion of address ⅔ decoder 68. Upon performing this additional preparatory task, the second microsequence then enables multiplexor 62 to select the micro address of the microsequence which will perform the actual operation as developed by the address 3 portion of address ⅔ decoder 68. In any event, the last microinstruction in the last microsequence of each instruction will enable multiplexor 62 to select the micro address of the first microinstruction of the next instruction as developed by address 1 decoder 56. In this manner, execution of each instruction will proceed through an appropriate sequence of microinstructions. A more thorough explanation of the micro address sequence selection mechanism is given in U.S. Pat. No. 4,342,078 entitled "Instruction Register Sequence Decoder for Microprogrammed Data Processor" issued July 27, 1982 to Tredennick et al.

In contrast to the microwords, the nanowords which are loaded into nano ROM output latch 44 indirectly control the routing of operands into and, if necessary, between the several registers in the exection unit 48 by exercising control over register control (high) 70 and register control (low and data) 72. In certain circumstances, the nanoword enables field translation unit 74 to extract particular bit fields from the instruction in IRD 66 for input to the execution unit 48. The nanowords also indirectly control effective address calculations and actual operand calculations within the execution unit 48 by exercising control over AU control 76 and ALU control 78. In appropriate circumstances, the nanowords enable ALU control 78 to store into status register SR the condition codes which result from each operand calculation by execution unit 48. A more detailed explanation of ALU control 78 is given in U.S. Pat. No. 4,312,034 entitled "ALU and Condition Code Control Unit for Data Processor" issued Jan. 19, 1982 to Gunter et al.

Figure 3:
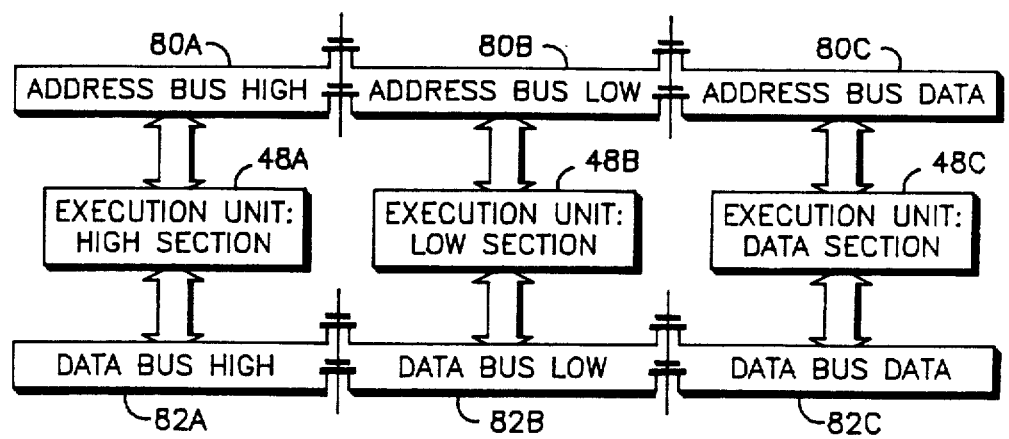
FIG. 3 is block diagram of the execution unit of the virtual memory data processor of FIG. 2.

As can be seen in FIG. 3, the execution unit 48 in VMDP 12, like the execution unit in the MC68000, comprises a high section 48A, a low section 48B, and a data section 48C, which can be selectively connected to respective segments of address and data buses 80 and 82, respectively. Since execution unit 48 is so similar to the execution unit of the MC68000 as described in U.S. Pat. No. 4,296,469, the common functional units will be described only briefly, followed by a more detailed description of the new elements which allow VMDP 12 to support virtual memory.

Figure 4:
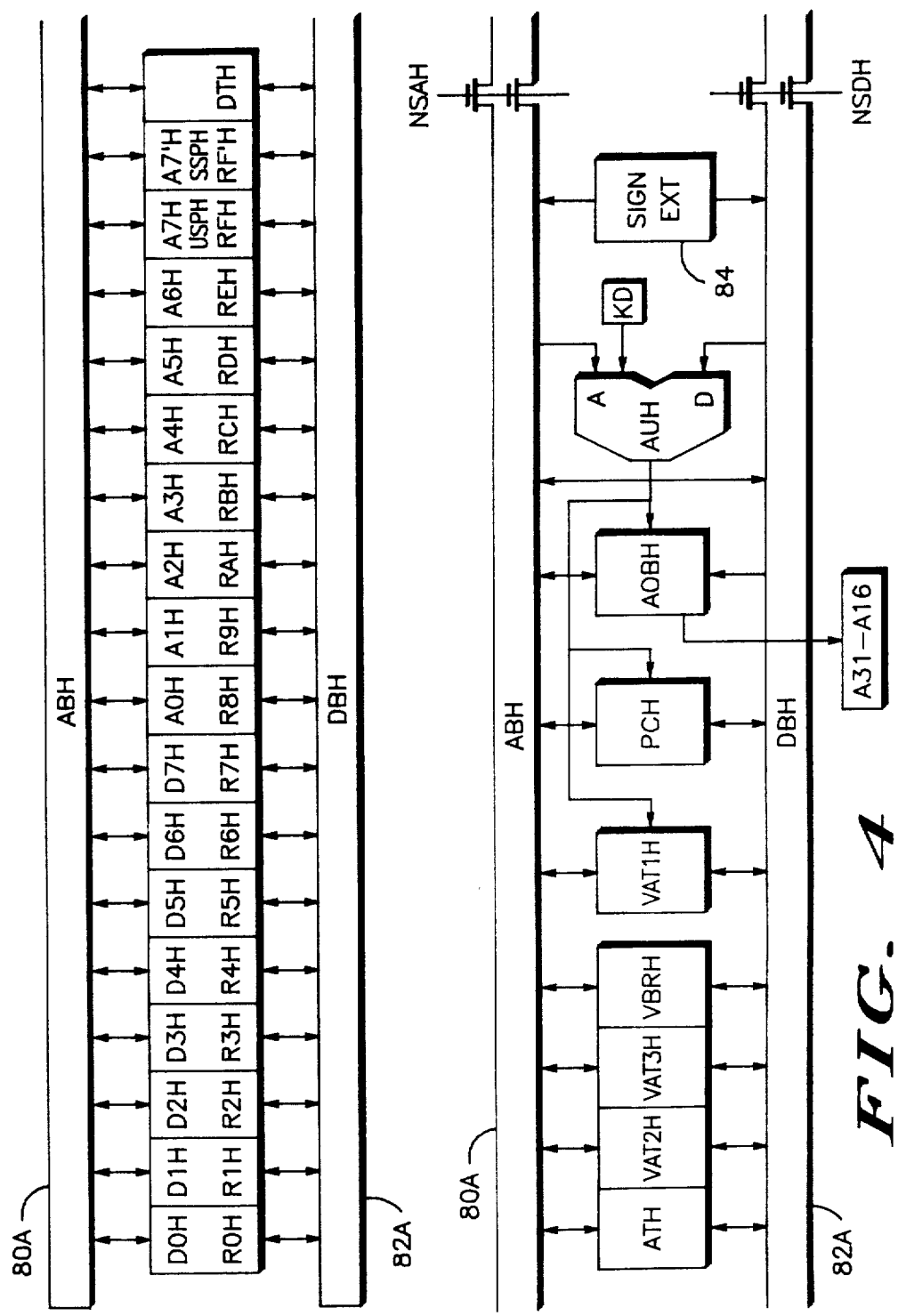
FIG. 4 is a block diagram of the high section of the execution unit of FIG. 3.
Figure 5:
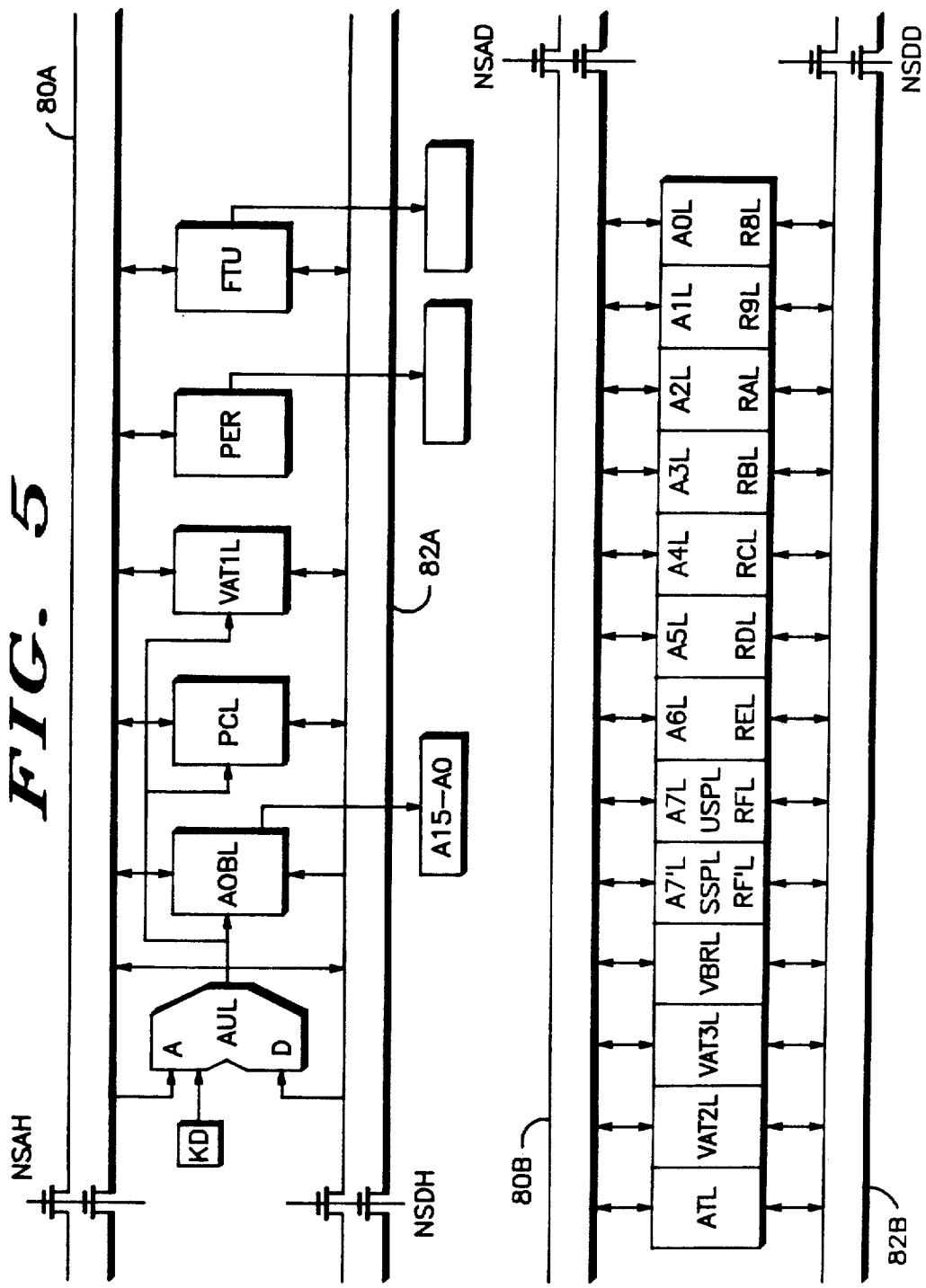
FIG. 5 is a block diagram of the low section of the execution unit of FIG. 3.
Figure 6:
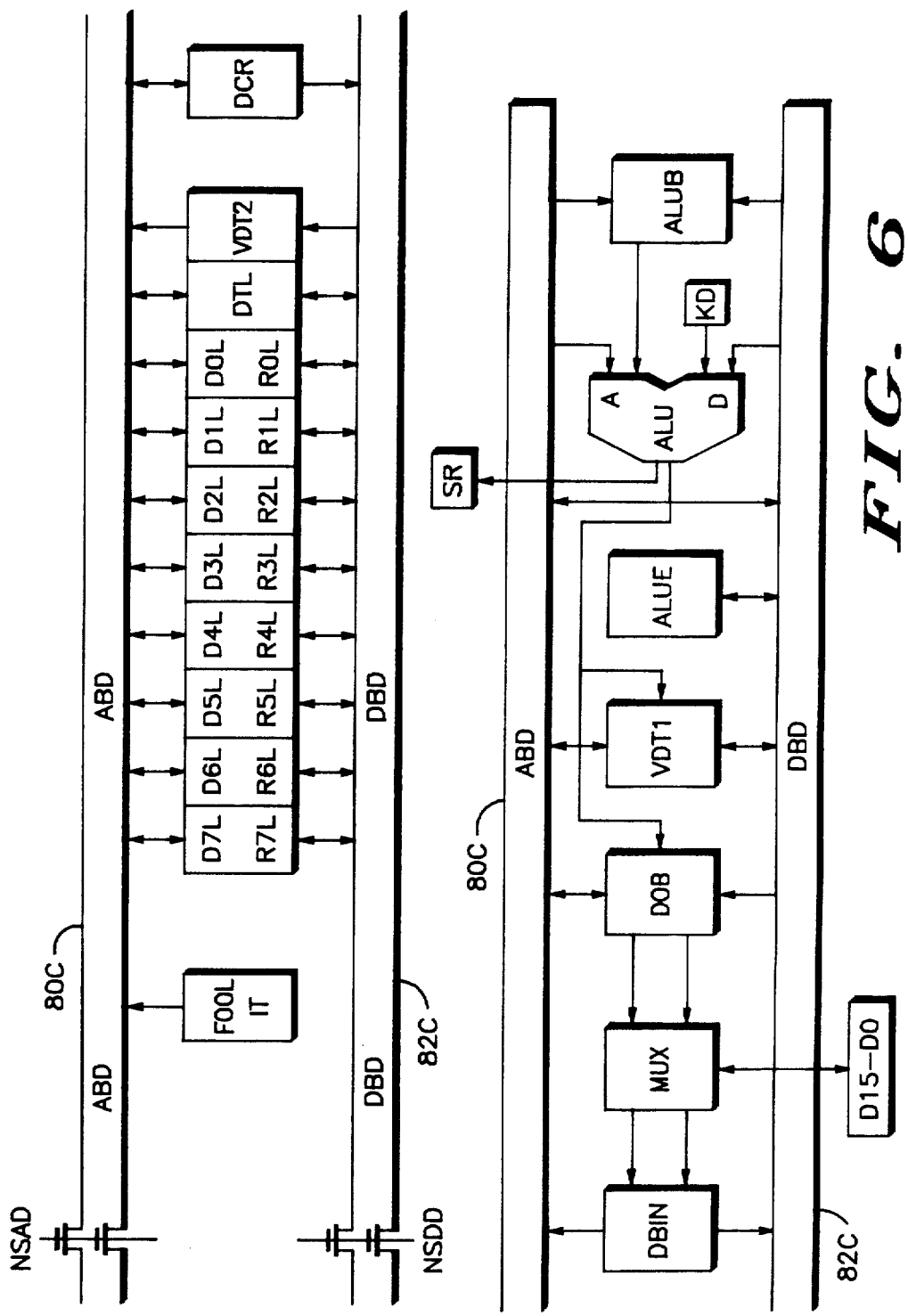
FIG. 6 is a block diagram of the data section of the execution unit of FIG. 3.

As shown in FIG. 4, the high section 48A is comprised primarily of a set of nine high address registers AØH-A7'H for storing the most significant 16 bits of 32 bit address operands, a set of eight high data registers DØH-D7H for storing the most significant 16 bits of 32 bit data operands, a temporary high address register ATH, a temporary high data register DTH, an arithmetic unit high AUH for performing arithmetic calculations on operands provided on the high section of address and data buses 80 and 82, a sign extension circuit 84 for allowing 32 bit operations on 16 bit operands, and the most significant 16 bits of the program counter PCH and address output buffers AOBH. As shown in FIG. 5, the low section 48B is comprised primarily of a set of nine low address registers AØL-A7'L for storing the least significant 16 bits of 32 bit address operands, an arithmetic unit low AUL for performing arithmetic calculations on operands provided on the low section of address and data buses 80 and 82, a priority encoder register PER used in multi-register move operations, and the least significant 16 bits of the program counter PCL and address output buffers AOBL. FIG. 5 also illustrates the relationship of an FTU register portion of field translation unit 74 to the low sections of address and data buses 80 and 82. As shown in FIG. 6, the data section 48C is comprised primarily of a set of eight low data registers DØL-D7L for storing 16 bit operands which may be the least significant 16 bits of 32 bit data operands, a decoder register DCR for generating 16 bit operand masks, an arithmetic and logic unit ALU for performing arithmetic and logical operations on operands provided on the data section of address and data buses 80 and 82, an ALU buffer register ALUB, an ALU extension register ALUE for multiword shift operations, and multiplexed data input and output buffers DBIN and DOB, respectively.

Thus far, VMDP 12 has been described in terms of the hardware features which are common with the MC68000. VMDP 12 also responds to error conditions in a manner somewhat similar to the MC68000. Recall that MMU 14 will signal an address error by generating a FAULT signal, while the other peripheral circuits report bus errors by issuing a BERR signal. In either event, VMDP 12 will receive a BERR signal via OR gate 32. In response to the BERR signal, bus controller 46 will notify exception logic 60 of the error and then orderly terminate the faulty bus cycle. Exception logic 60 then provides multiplexor 62 with the micro address of the bus error exception handler microsequence to be forced into the micro address latch 64. At this point, the MC68000 would simply load the micro address provided by exception logic 60 into micro address latch 64 and control would pass to the exception handler microsequence to stack out the following information:

SSWB—Special System Status Word Bus;
AOBH—Access Address High;
AOBL—Access Address Low;
IRD—Instruction Register Decode;
SR—Status Register;
PCH—Program Counter High; and
PCL—Program Counter Low.

Figure 7:
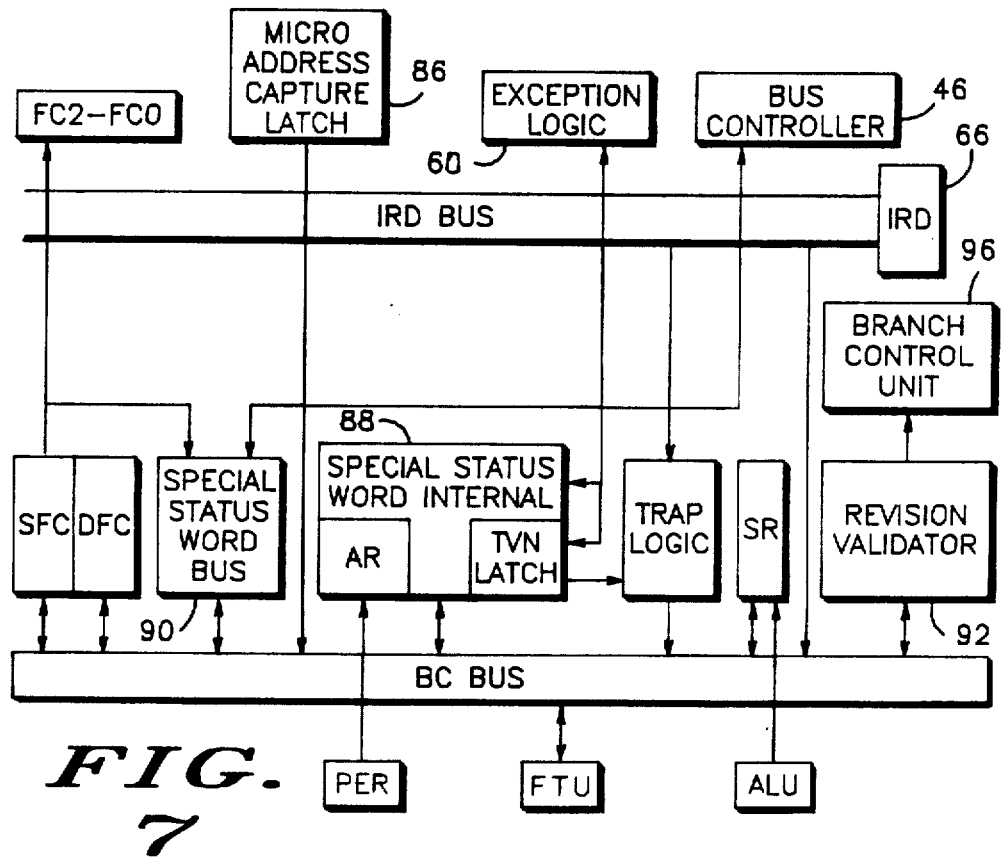
FIG. 7 is a block diagram illustrating the relationship of the field translation unit of the virtual memory data processor of FIG. 2 to other functional units therein.

While this information is ordinarily adequate to determine the cause of the error, this information is not sufficient to allow the present state to be restored after the error has been resolved. Accordingly, VMDP 12 internally saves additional information about the current state thereof, before loading the micro address of the exception handler microsequence. To accomplish this, VMDP 12 has several additional registers for capturing the necessary state information, and some additional access paths are provided to certain existing registers. For example, as shown in FIG. 2, VMDP 12 has a micro address capture latch 86 for storing the micro address in the micro address latch 64 at the time the fault occurred. Within field translation unit 74, a special status word internal (SSWI) register 88 is provided as shown in FIG. 7 to save the following:

PR—Trap Privilege Exception Latch (from exception logic 60);
TR—Trap Trace Exception Latch (from exception logic 60);
TP—Trace Pending Latch (from SR);
LP—Loop Mode Latch (new bit);
HX—Hidden-X Status Bit (from ALU);
ARx—Priority Encoder Output Register Selector (from PER); and
TVN—Trap Vector Number Latch (from exception logic 60).

In addition, the special status word bus (SSWB) register 90 in field translation unit 74, which in the MC68000 saved only:

R/W—Read/Write (R/W); and
FC—Function Code for faulted access; now saves the following additional information:
IF—nanoROM bit NIRC (instruction fetch to IRC);
DF—nanoROM bit NDBI (data fetch to DBIN);
RM—Read-Modify-Write cycle;
HB—nanoROM bit NIOH (high byte transfer from DOB or to DBIN); and
BY—byte/word transfer.

Once this additional state information has been latched, VMDP 12 loads the micro address provided by exception logic 60 into micro address latch 64 and begins executing the exeception handler microsequence. In the exception handler microsequence of VMDP 12, the initial microinstructions must clear the address calculation and output paths in execution unit 48 so that the stack address may be safely calculated and provided to MMU 14. Accordingly, several additional registers are provided in the execution unit 48 to store the existing address, data and control information: in the high section 48A shown in FIG. 4, three virtual address temporary high registers VAT1H-VAT3H are provided to facilitate capture of the output of AUH and the address in AOBH; in the low section 48B shown in FIG. 5, three virtual address temporary low registers VAT1L-VAT3L are provided to allow capture of the output of AUL and the address in AOBL; and, in the data section 48C shown in FIG. 6, two virtual data temporary registers VDT1-VDT2 are provided to store the control information in FTU and the data in DOB. Having cleared the execution unit 48, the exception handler calculates the stack address and proceeds to stack the following information:

SR—Status Register;
PCH—Program Counter High;
PCL—Program Counter Low;
VOR—Stack Frame Format and Vector Offset;
SSWB—Special System Status Word Bus;
AOBH—Access Address High;
AOBL—Access Address Low;
DOB—Data Output Buffer;
DIB—Data Input Buffer;
IRC—Instruction Register Capture;
MAL—Micro Address Capture Latch;
ALUB—Contents of ALUB;
FTU—Field Translate Unit Register;
ATH—Address Temporary High
ALU—ALU Output Latch
ATL—Address Temporary Low;
AUH—AU Latch High;
AUL—AU Latch Low;
DCRL—Decoder Latch;
PERL—PER Output Register;
SSWI—Special Status Word Internal
IR—Instruction Register
DTH—Data Temporary High;
DTL—Data Temporary Low;
IRD—Instruction Register Decode; and
ALUE—ALUE Register.

The exception handler microsequence then vectors to the error recovery routine in the supervisor program. Using the stacked state information, the supervisor program can determine the cause of the fault, and, if appropriate, attempt to fix the problem. For example, an access to a logical address which has no corresponding physical address may simply require that a block of program/data be loaded from mass storage 26 into memory 20. Of course, other processing may also be performed before the faulted program is restarted.

To return control to a program which has been suspended, the supervisor program in both the MC68000 and VMDP 12 executes a return from exeception (RTE) instruction. In the MC68000, this instruction will be executed only if the exception was of the type which occurred on instruction boundaries. Thus, the microsequence for this instruction could simply reload the status register SR and program counter PCH-PCL from the stack, and then pass control to the instruction whose address is in the program counter. In VMDP 12, this instruction is also used to return from access faults which typically occur during execution of an instruction. Accordingly, the initial microinstructions in this microsequence fetch the VOR word from the stack to determine the stack frame format. If the short format is indicated, the microsequence will proceed as in the MC68000. If, on the other hand, the long format is indicated, several other words are fetched from the stack to assure that the full frame is available in memory. If the frame format is neither short nor long, VMDP 12 will assume that the stack frame is either incorrect or was generated by an incompatible type of processor and will transfer control to a stack frame format error exception handler microsequence. If another fault is generated at this stage, indicating that a portion of the stack frame has been inadvertantly swapped out of memory 20, the same access fault handling procedure will be used to retrieve the rest of the stack.

During the microsequence which stacks the state information, the micro address contained in the micro address capture latch 86 is coupled to the FTU via a portion of the BC bus, as shown in FIG. 7. Simultaneously, revision validator 92 impresses on the available portion of the BC bus a code which uniquely identifies the version of the microcode contained within VMDP 12. This combined word is subsequently transferred into DOB in the data section 48C of the execution unit 48 for output via data buffers 94 to memory 20. During the validation phase of the instruction continuation microsequence, the MAL word is fetched from the stack and loaded into both IRC 52 and DBIN in the data section 48C of the execution unit 48. From DBIN, MAL is transferred to FTU and coupled to the BC bus. Revision validator 92 then compares the version number portion of MAL to the internal version number. If they are not the same, revision validator 92 will signal branch control unit 96 to transfer control to the stack frame format exeception handler microsequence. Otherwise, revision validator 92 will simply allow the microsequence to load the micro address portion of MAL into address 4 latch 98.

Once the stack frame has been determined to be valid, the microsequence will enter a critical phase where any fault will be considered a double fault and VMDP 12 will terminate processing until externally reset. During this phase, the rest of the information in the stack is fetched and either reloaded into the original locations or into the several temporary registers. For example, the contents of the micro address latch 64 which were captured by the micro address capture latch 86 will be loaded into address 4 latch 98. However, only after the last stack access are the contents of AUH-AUL and SR restored from the temporary registers. The last microinstruction in this instruction continuation microsequence restores the contents of AOBH, AOBL, FTU, and DOB, signals bus controller 46 to restart the faulted bus cycle using the information in SSWB 90, and requests multiplexor 62 to select the micro address in address 4 latch 98.

In the preferred form, bus controller 46 will respond to the restart signal provided by the last microinstruction of the instruction continuation microsequence by examining a rerun bit RR in SSWB 90. If the supervisor has not set the RR bit in the stack, the bus controller 46 will proceed to rerun the faulted bus cycle under control of the other information in SSWB 90, and then signal exception logic 60 when the cycle has been successfully completed. If, on the other hand, the supervisor has set the RR bit, the bus controller 46 will not rerun the bus cycle, but will simply signal exception logic 60 that the cycle is complete. In response to the cycle complete signal, exception logic 60 will enable multiplexor 62 to output the micro address in address 4 latch 98 to micro address latch 64. The faulted instruction will then resume control of VMDP 12 as if the fault had never occurred.

VMDP 12, unlike the MC68000, is also capable of creating the illusion that the currently executing user program is executing in the supervisor state. This has been achieved by making all instructions which access the supervisor/user bit in status register SR into privileged instructions. Thus, whenever an attempt is made by the user program to modify or even read the supervisor/user bit, control will automatically revert to the supervisor. The supervisor will then be able to prepare and return a suitably modified image of SR to the user program. The user program, being insulated from the true SR, can then pretend that it is the supervisor. With the help of the true supervisor, this pseudo supervisor can control the execution of other user programs. This capability to control accesses to both real and non-existent system resources from user programs, whether true user or pseudo supervisor, enables the user to use VMDP 12 to create a virtual machine environment.

We claim:

1. A virtual machine data processor comprising:
   external access means for providing access to a resource external to said data processor;
   instruction execution control means coupled to said external access means, for controlling the execution by said data processor of at least one instruction which requires at least one access to said resource via said external access means;
   access fault recovery means coupled to said external access means and to said instruction execution control means, for storing information indicative of the state of said instruction execution control means as of the time a fault is detected with said one access, said access fault recovery means restoring the state of said instruction execution control means using said stored state information after said fault has been corrected and then enabling said instruction execution control means to resume execution of said one instruction from said restored state; and
   access rerun control means coupled to said external access means and to said access fault recovery means, for enabling said external access means to rerun said one access upon said access fault recovery means enabling said instruction execution control means to resume execution of said one instruction, except in response to a rerun signal indicating that said one access should not be rerun.

2. The data processor of claim 1 wherein said access rerun means is responsive to said rerun signal being in said stored state information.

3. The data processor of claim 1 further comprising:
   exception handling means coupled to said instruction execution control means and to said access fault recovery means, for enabling said instruction execution control means to control the execution by said data processor of a selected sequence of instructions to correct said fault after said access fault recovery means has stored said state information.

4. The data processor of claim 3 wherein said exception handling means also completes said one access after correcting said fault, stores any results thereof together with said stored state information, and then provides said rerun signal to said access rerun control means indicating that said one access should not be rerun.

5. In a virtual machine data processor comprising:

external access means for providing access to a resource external to said data processor; and instruction execution control means coupled to said external access means, for controlling the execution by said data processor of at least one instruction which requires at least one access to said resource via said external access means;

a method for said virtual machine data processor to recover from a fault in an access to said resource during the execution by said data processor of said one instruction, comprising the steps of:

storing, via access fault recovery means in said data processor, information indicative of the state of said data processor upon detecting said fault;

restoring, via said access fault recovery means, the state of said data processor using said stored state information after said fault has been corrected;

enabling, via said access fault recovery means, said data processor to resume execution of said one instruction from said restored state; and rerunning, via access rerun control means in said data processor, said access upon said data processor resuming execution of said one instruction, except in response to a rerun signal indicating that said access should not be rerun.

6. The method of claim 5 further including the step of:

providing said rerun signal in said stored state information.

7. The method of claim 5 further including the step of:

enabling, via exception handling means in said data processor, said data processor to execute a selected sequence of instructions to correct the detected access fault after said state information has been stored.

8. The method of claim 7 wherein said selected sequence of instructions also completes said access after correcting said fault, stores any results thereof together with said stored state information, and then provides said rerun signal to indicate that said access should not be rerun.

* * * * *